(12) United States Patent
Stahl, Sr.

(10) Patent No.: US 7,523,590 B2
(45) Date of Patent: Apr. 28, 2009

(54) INTUMESCENT FIRESTOPPING APPARATUS AND METHOD

(75) Inventor: James P. Stahl, Sr., Stockton, NJ (US)

(73) Assignee: Specified Technologies Inc., Somerville, NJ (US)

( * ) Notice: Subject to any disclaimer, the term of this patent is extended or adjusted under 35 U.S.C. 154(b) by 276 days.

(21) Appl. No.: 11/282,546

(22) Filed: Nov. 18, 2005

(65) Prior Publication Data

US 2007/0125018 A1    Jun. 7, 2007

(51) Int. Cl.
E04C 2/52 (2006.01)
E04C 2/00 (2006.01)
E04B 1/94 (2006.01)

(52) U.S. Cl. ................. 52/232; 52/220.8; 52/317
(58) Field of Classification Search ............. 52/1, 52/232, 317, 220.8; 174/483
See application file for complete search history.

(56) References Cited

U.S. PATENT DOCUMENTS

| 3,678,634 | A | * | 7/1972 | Wise et al. | 52/1 |
| 4,109,423 | A | * | 8/1978 | Perrain | 52/1 |
| 4,136,707 | A | * | 1/1979 | Gaillot et al. | 137/75 |
| 4,548,853 | A | * | 10/1985 | Bryan | 428/131 |
| 5,257,641 | A | * | 11/1993 | Elsbury et al. | 137/79 |
| 5,331,946 | A | * | 7/1994 | Yamini et al. | 126/314 |
| 5,661,891 | A | * | 9/1997 | Miller et al. | 29/453 |
| 6,176,052 | B1 | * | 1/2001 | Takahashi | 52/232 |
| 6,360,502 | B1 | * | 3/2002 | Stahl, Jr. | 52/232 |
| 6,732,481 | B2 | * | 5/2004 | Stahl, Sr. | 52/406.1 |
| 6,848,227 | B2 | * | 2/2005 | Whitty | 52/232 |
| 6,928,777 | B2 | * | 8/2005 | Cordts | 52/220.8 |
| 6,969,799 | B2 | * | 11/2005 | Snyder | 174/483 |
| 2003/0051423 | A1 | * | 3/2003 | Munzenberger | 52/220.8 |
| 2004/0016191 | A1 | * | 1/2004 | Whitty | 52/232 |
| 2006/0138251 | A1 | * | 6/2006 | Stahl | 239/309 |

* cited by examiner

*Primary Examiner*—Richard E Chilcot, Jr.
*Assistant Examiner*—Elizabeth A Plummer
(74) *Attorney, Agent, or Firm*—Sperry, Zoda & Kane

(57) ABSTRACT

A firestopping apparatus for providing a fire barrier in a construction barrier. The apparatus is comprised of a sleeve within which there are located intumescent pads that are oriented to form a confinement area therebetween to accommodate various penetrating members such as cables, conduits and the like that need to pass through the barrier. Upon sensing the heat from a fire, the intumescent pads seal around the penetrating members to prevent the fire from passing through the barrier. One or both of the intumescent pads is movable toward or away from the other so that the confinement area can be adjusted in size, that is, the confinement area can be increased in size to accommodate a large number of penetrating members of decreased to accommodate a lesser number. One or both of the intumescent pads may be biased in the direction toward decreasing the size of the confinement area.

25 Claims, 6 Drawing Sheets

INTUMESCENT FIRESTOPPING APPARATUS AND METHOD

FIELD OF THE INVENTION

The invention generally relates to apparatus for providing a firestop within a construction opening and, more particularly, to a firestopping apparatus having intumescent pads that form a confinement area therebetween through which penetrating members can pass through the construction opening.

BACKGROUND OF THE INVENTION

It is commonplace in the construction and renovation of commercial and residential buildings for the need to pass cables, conduits and the like through construction barriers such as walls, floors ceilings. However, the presence of an opening through such barriers raises a potential hazard in that a fire can use those opening to pass through the construction barrier, which of itself is an effective fire barrier, and the fire can then spread to adjoining areas of the building. As such, fire barriers are normally located with the openings that are designed to prevent the passage of fire through those openings.

One such apparatus for providing an effective firestop is shown and described in U.S. Pat. No. 6,732,481 issued May 1, 2004 to James P. Stahl, Sr. and the disclosure of that patent is hereby incorporated herein in its entirety by reference.

In the aforedescribed patent, there is a firestop that includes two intumescent pads that are generally located opposite to each other so as to form a confinement area therebetween through which the penetrating members can extend in passing through the construction barrier. In the event of a fire, the intumescent pads react to the heat to tightly seal against the penetrating member so as to close any path for the fire to pass through the construction barrier to other areas of the building.

While the fire barrier of the aforesaid patent is perfectly acceptable, it can be improved by having some flexibility in the spacing between the intumescent pads so as to accommodate large and small volumes of penetrating members with the same effectiveness in sealing the opening in the event of a fire i.e. so that both large volumes and cross sections of penetrating members can be equally sealed against as smaller volumes of such members.

Accordingly, it would be advantageous to have a fire stop apparatus of the type described in the aforedescribed U.S. Patent but additionally have more flexibility and versatility in the formation and adjustment of the size of the confinement area between the intumescent pads so as to be able to effectively seal the opening where a large volume of penetrating members are concerned as well as a smaller volume of penetrating members.

In addition, there is a further problem in the installation of the subject barriers in that currently where a plurality of such barriers are installed together, such as the sleeves of the Stahl, Sr. '481 patent, the installation is difficult since the sleeves are normally simply squeezed together and held therein by a wall flange or frame and, in practice, the adjacent sleeves are difficult to handle and can slip out of alignment. The problem is exacerbated when the installation of the plurality of sleeves is through a floor where gravity is basically working against the installation of the ganged sleeves. It would, therefore, be advantageous to have a securing system or mechanism that enables the installer to align and secure adjacent sleeves together to facilitate their installation in a construction barrier.

SUMMARY OF THE INVENTION

The present invention thus improves upon the invention of the Stahl, Sr. '481 patent by providing a system for adjusting the size of the confinement area that is intermediate the intumescent pads and through which the penetrating members pass so as to accommodate different sizes of penetrating members and still effectively seal the opening though a construction barrier against the passage of fire.

In accordance with the present invention, therefore, there is a sleeve that is adapted to pass through a construction barrier such as a floor, wall, ceiling of the like. The sleeve thereby provides an access corridor through the construction barrier in order to pass penetrating members through the construction barrier. The sleeve can have oppositely disposed outer walls and which may include top bottom and side walls.

Within the sleeve, there are intumescent pads that are oriented so as to form a confinement area therebetween for accommodating the penetrating members that pass through the construction barrier. As is known, therefore, when the intumescent pads are heated such as from a fire, the intumescent pads seal tightly around the penetrating members to prevent a passage for the fire to pass through the confinement area.

With the present invention, one or both of the intumescent pads can be mounted for movement within the sleeve so as to adjust the size of the confinement area, that is, one of the intumescent pad can be moved toward or away from the other intumescent pad to thereby decrease or increase the size of the confinement area which accommodates the penetrating members or, alternatively, both of the intumescent pads are movable to reduce or expand the size of the confinement area.

As such there is a mechanism or system designed to carry out that movement of the intumescent pads and, in the exemplary embodiment, the movement is accomplished by providing a pair of inner members to which each intumescent pad is individually affixed. In the embodiment, the inner members are flat planar walls that are mounted within the sleeve so as to be movable toward each other while remaining generally in a plane parallel to the planes of the top and bottom walls.

As a further feature of the invention, one intumescent pad can be biased toward the other intumescent pad, that is, pushed or pulled in the direction of the other intumescent. In the alternative, both intumescent pads may be biased toward each other. Again, in the exemplary embodiment, the biasing may be provided by a plurality of springs that are positioned intermediate the inner member and an outer wall, such as the top or bottom walls.

The effect of the bias can be directed at various locations along the intumescent pad i.e. at the exterior ends of the intumescent pad, the center or any other desired location or portion of the intumescent pad. One location can be wherever the intumescent pad is affixed to the inner member and that location also may be a various locations across the intumescent pad.

As a still further feature of the present invention, there is a securing mechanism that aligns and secures together adjacent sleeves so as to facilitate the installation of a plurality of sleeves at the same time. The system therefore can include, for example, interlocking mating devices on the sleeves themselves so that one sleeve can readily be affixed to another sleeve to be installed together.

BRIEF DESCRIPTION OF THE DRAWINGS

A more complete understanding of the invention may be obtained from consideration of the following description in conjunction with the drawings in which.

DETAILED DESCRIPTION

Figure 1:
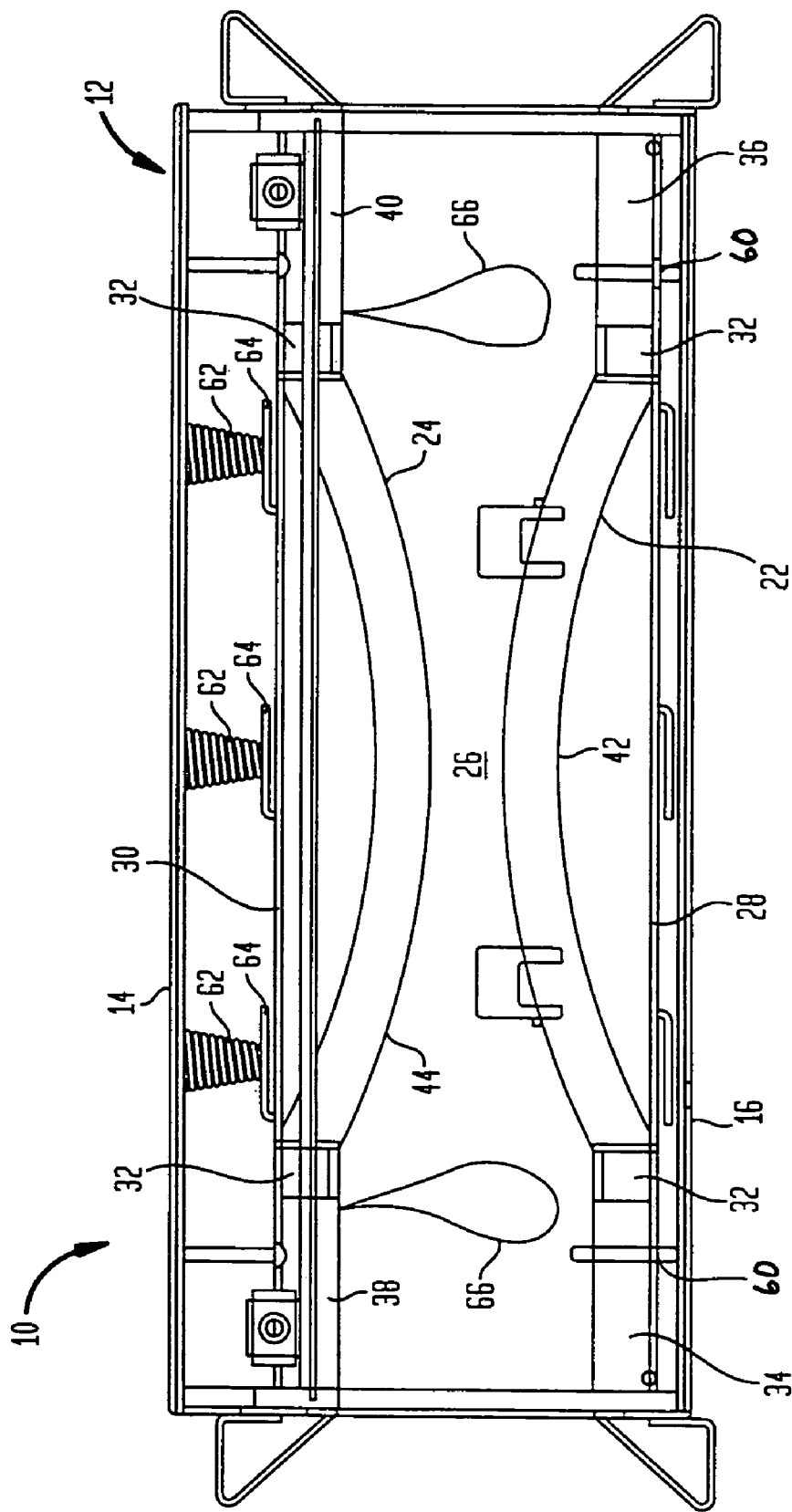
FIG. 1 is a side schematic view of an exemplary firestopping apparatus in accordance with one embodiment of the present invention with the intumescent pads displaced a distance from one another.
Figure 2:
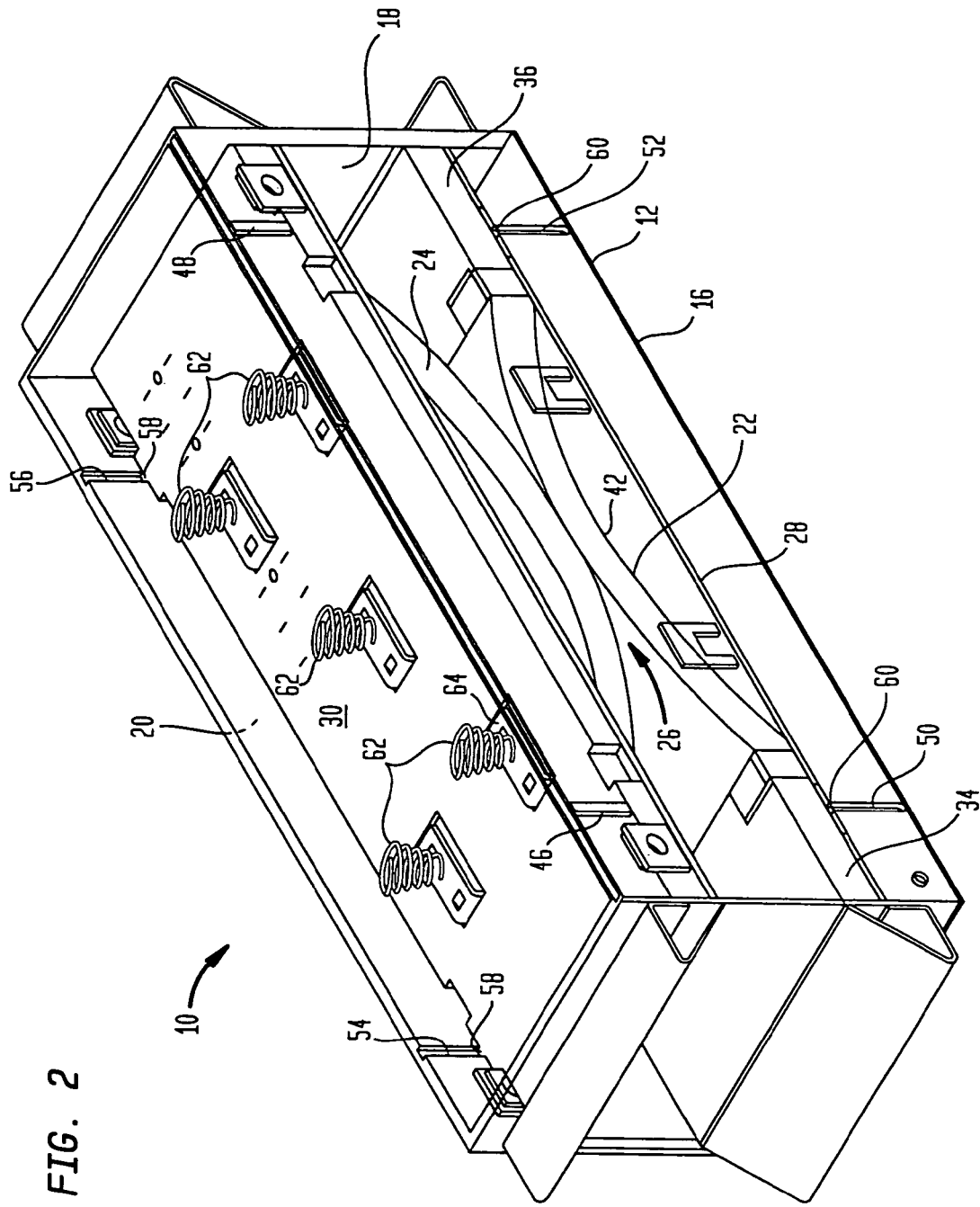
FIG. 2 is a perspective schematic view of the side view of the exemplary firestopping apparatus depicted in FIG. 1, FIG. 3A and 3B are a plan view and a side view, respectively, illustrating an exemplary protective skirt that can be used with the present invention.

In FIGS. 1 and 2, there is shown a side schematic view and a perspective schematic view, respectively, of an intumescent firestopping apparatus 10 constructed in accordance with one embodiment of the present invention. As can be seen, the apparatus 10 includes a sleeve 12 that is designed to fit into and pass through an opening in the construction barrier and be fixed therein in the manner as shown and described in the aforementioned Stahl, Sr. U.S. Pat. No. 6,732,481, thereby providing an access corridor through the construction barrier.

The sleeve 12 is defined by a plurality or exterior walls, and, as shown, there can be seen a top wall 14, a bottom wall 16 and side walls 18, 20 and, in the exemplary embodiment, the top and bottom walls 14, 16 and the side walls 18, 20 are disposed in parallel planes to each other. As described herein, the reference to a top and bottom wall is simply for purposes of explaining the invention, it being seen that the sleeve 12 could be oriented in any number of alternate positions rotated with respect to the orientation shown in the Figures.

Within the sleeve 12, there is located a first intumescent pad 22 and a second intumescent pad 24 that are oppositely disposed and which form a confinement area 26 therebetween. As will later become clear, that confinement area 26 is adjustable to accommodate variable cross sectional volumes of penetrating members, that is, the number and size of the various penetrating members will be defined as a volume and that volume depends on the number and size of the penetrating members. As such, there may be a large volume of penetrating members that take up considerable space within the confinement area 26 or a lesser volume that take up a smaller space of the confinement area 26.

Accordingly, the first and second intumescent pads 22. 24 are mounted to inner members 28, 30 and which, in the exemplary embodiment of FIG. 1, the inner members 28, 30 are flat, planar walls that are oriented in planes generally parallel to the top and bottom walls 14, 16. The first and second intumescent members 22, 24 are mounted to the respective inner members 28, 30 in a similar manner and, in the illustrated embodiment, there are clips 32 that extend over the exterior ends 34, 36 of the first intumescent pad 22 and around the inner member 28 to secure the exterior ends 34, 36 of the intumescent pad 22 to the inner member 28 i.e. the exterior ends 34, 36 and the inner member 28 are sandwiched between the ends of clips 32. In a similar manner, the exterior ends 38, 40 of the second intumescent pad 24 are affixed to the inner member 30.

Thus, by the described mounting system, the respective exterior ends 34, 36 and 38, 40 of the first and second intumescent pads 22, 24 are securely affixed to the inner members 28, 30 and thereby freeing the central, flexible portions 42, 44 of the intumescent pads 22, 24 to expand inwardly upon sensing of heat from a fire to seal against the penetrating members passing through the confinement area 26. While the use of clips 32 is shown in the exemplary embodiment, it can be appreciated that there are other methods of securing the exterior ends 34, 36 and 38, 40 of the first and second intumescent pads 22, 24 to the inner members 28, 30, such as tabs, adhesives or the like.

In addition, as alternate embodiments, the intumescent pads 22, 24 may be affixed to the inner members 28, 30 by securing some other portion or portions of the intumescent pad to an inner member other than the exterior ends of an intumescent pad, that is, there may be only one exterior end of an intumescent pad affixed to an inner member or some other portion or portions of an intumescent pad affixed to an inner member. It is possible to incorporate a flat spring disposed behind and affixed to each intumescent pad 22, 24 as disclosed in the U.S. Pat. No. 6,732,481 for providing and maintaining the desired inwardly extending pad shape. As a consequence it would be possible to secure the intumescent pads 22, 24 to the inner members 28, 30 by securing the corresponding flat springs to the inner members 28, 30 at one or more locations.

At least one of the intumescent pads 22, 24 is movable toward and away from the other in order to adjust the space with the confinement area 26, that is, the confinement area 26 can be contracted or expanded by moving one or both of the intumescent pads 22, 24 toward or away from each other. The movement of the first and second intumescent pads 22, 24, in the exemplary embodiment, is accomplished by providing a system for moving the inner members 28, 30. Thus, as shown, there are elongated slots 46, 48 formed in the side wall 18 proximate the top wall 14 and elongated slots 50, 52 also located in the side wall 18 but proximate to the bottom wall 16. In a similar fashion, there are elongated slots 54, 56 formed in the sidewall 20, again proximate to the top wall 14 and also elongated slots, not shown, that are formed in the side wall 20 proximate to the bottom wall 16.

There are a plurality of tabs 58 that extend outwardly from the inner member 30 and each extend through the elongated slots 46, 48 and 54, 56 so that the inner member 30, and therefore the intumescent pad 24 can move toward and away from the intumescent pad 22 and that movement is guided by means of the tabs 58 that ride in the elongated slots 46, 48 and 54, 56. As can therefore be seen, the inner member 30 can, in the exemplary embodiment, move toward and away from the intumescent pad 22 while staying in a plane that is generally parallel to the plane of the top wall 14.

In a similar manner, there are a plurality of tabs 60 that extend outwardly from the inner member 28 and which extend through the elongated slots 50, 52 and similar tabs extend through the similarly oriented elongated slots formed in the side wall 20 proximate to the bottom wall 16 so that the inner member 28 and the first intumescent pad 22 can also be movable within the sleeve 12 to move toward and away from the second intumescent pad 24.

Accordingly, as can now be appreciated, both of the first and second intumescent pads 22, 24 are movable toward and away from each other in the exemplary embodiment, however, it can also be appreciated, that other embodiments may be constructed where only one of the intumescent pads may move toward the other intumescent pad such that one of the intumescent pads is held stationary with respect to the sleeve 12.

In accordance with another aspect of the invention, there is a biasing system to bias one or both of the first and second intumescent pads 22, 24 toward each other. In the exemplary embodiment, there can be seen a plurality of springs 62 that are located between the top wall 14 and the inner member 30 and therefore act against both components. Since the top wall 14 is fixed with respect to the sleeve 12, and the inner member 30, as explained, is movable, the springs 62 tend to bias the inner member 30 and thus the second intumescent pad 24 inwardly toward the first intumescent pad 22. The springs 62 can be affixed to the inner member 28 by means of attachment devices 64 that facilitate the attachment of the springs 62 to the inner member 28.

Accordingly, the spring bias acts against the second intumescent pad 24 as shown in FIGS. 1 and 2, or can provide the bias at any particular location along the intumescent pad 24, such as at the exterior ends 38, 40, the center or at any other location along the intumescent pad 24, and, in particular, the biasing action can be directed at the area or location where the intumescent pad 24 is affixed to the inner member 30.

Again, as noted, the use of the biasing on the inner member 30 and thus to the second intumescent pad 24 can be applied to either of the first or second intumescent pads 22, 24 or to both of the first and second intumescent pads 22 by means of the same or other biasing mechanisms. Other such biasing mechanisms can include the use of elastic members, hydraulic biasing or other mechanism that provide a bias on either or both of the intumescent pads towards each other.

There can also be seen in FIG. 1, a protective skirt 66 that is mounted within the sleeve 12 at both ends thereof and the protective skirt 66 comprises a poly film that is folded over to form a loop and the free ends of the loop are heat sealed to one of the intumescent pads. As shown in FIG. 1, the protective skirt 66 is sealed to the intumescent pad 24 and hangs downwardly therefrom.

Figure 3A:
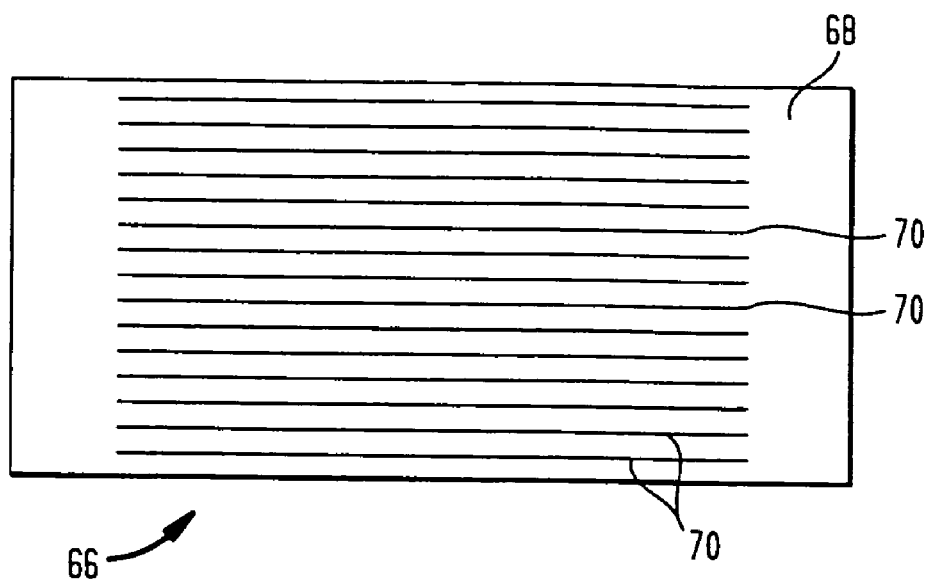
Figure 3B:
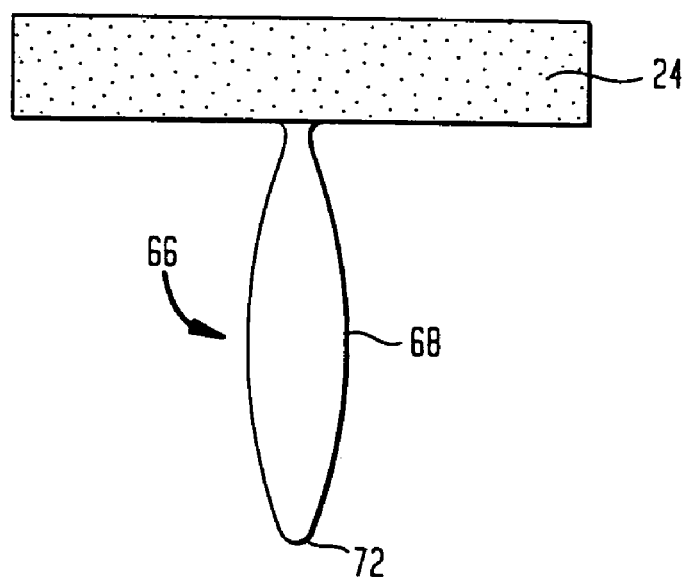

Turning briefly to FIGS. 3A and 3B, there can be seen a plan view and a side view of the protective skirt 66. In FIG. 3A, the poly film sheet 68 is illustrated and there are a plurality of slits 70 made in the poly film skirt 68 such that, in use, there are a plurality of individual loops formed in the protective skirt 66. In FIG. 3B, there can be seen the formation of the loop 72 at the lower end of the protective skirt 66 and the upper portion of the protective skirt 66 where the poly film sheet 68 is pinched together and heat sealed to the intumescent pad 24.

The use of the protective skirt is to advantageously restrict air flow as well as to provide dust protection for the interior of the sleeve 12. The vertically oriented slits 70 create individual loops that are displaced backwardly or sidewise to each other as the penetrating members are passed through the sleeve 12.

Figure 4:
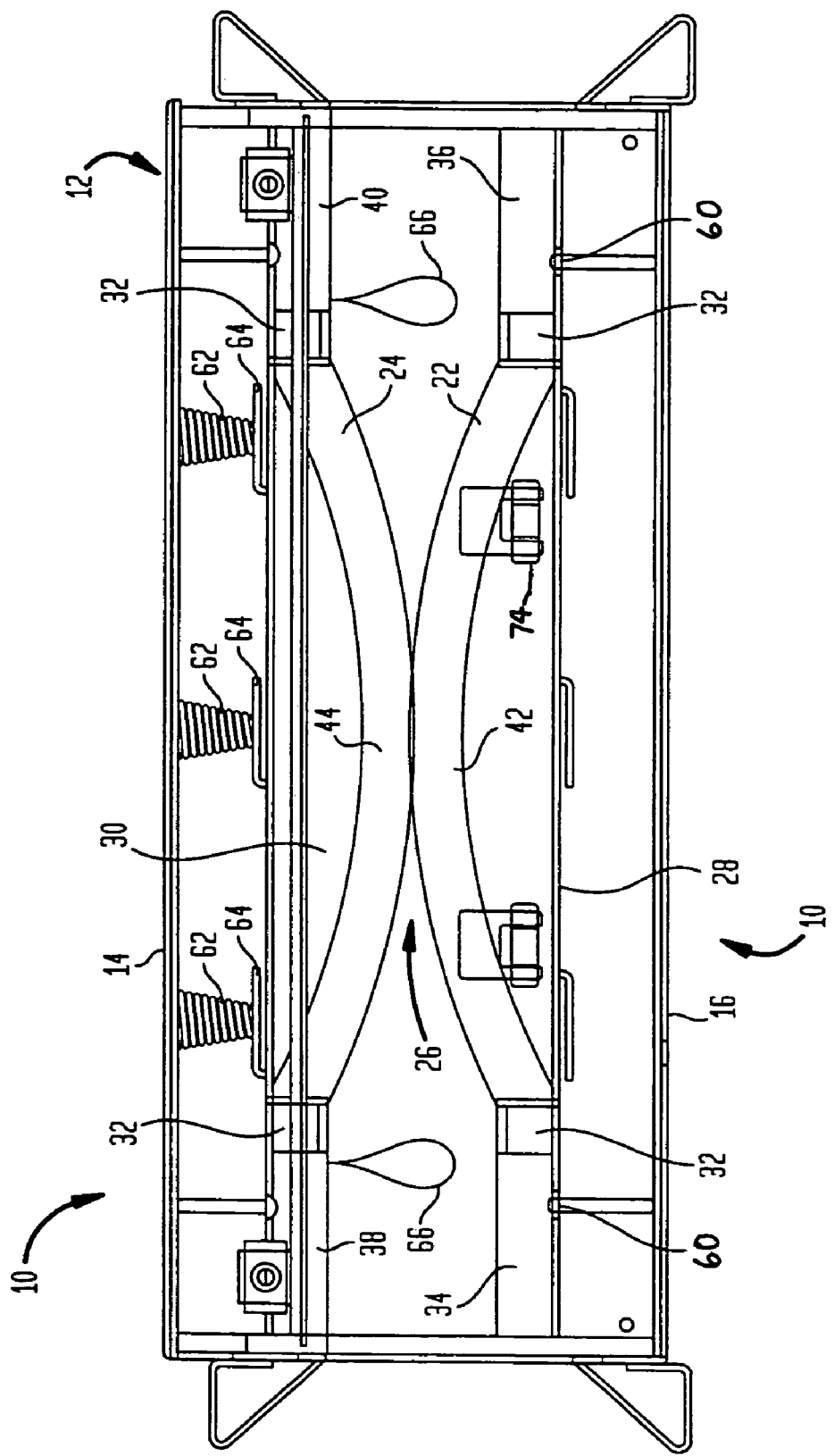
FIG. 4 is a side schematic view of the exemplary firestopping apparatus of FIG. 1 with the intumescent pads moved close to each other.

Turning next to FIG. 4, there is shown a side schematic view of the present invention wherein the first intumescent pad 22 has been displaced inwardly toward the second intumescent pad 24 and that displacement is accomplished by sliding the inner member 28 toward the second intumescent pad 24 wherein the tabs 60 slide within the confines of the elongated slots 50 and 52 to reach their innermost positions. The effect of moving the first intumescent pad 22 toward the second intumescent pad 24 is to thereby reduce the size of the confinement area 26 and to illustrate the means by which the confinement area 26 can be adjusted to accommodate different sizes of penetrating members.

There is also a securing mechanism that is used for affixing together adjacent sleeves and which facilitates the installation of a plurality of adjacent sleeves through a construction barrier. As such, in the exemplary embodiment, there can be seen in FIG. 4, a projecting member 74 that is formed in the side wall 18 and which interfits into a opening formed in a corresponding member, not shown, in the side wall of an adjacent sleeve.

Figure 5A:
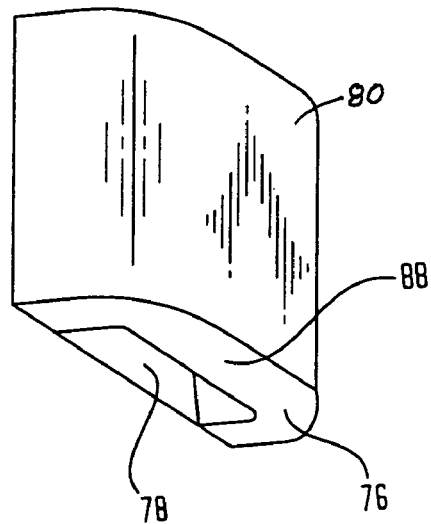
FIG. 5A and FIG. 5B are perspective view of the components of an exemplary securing mechanism used with the present invention.
Figure 5B:
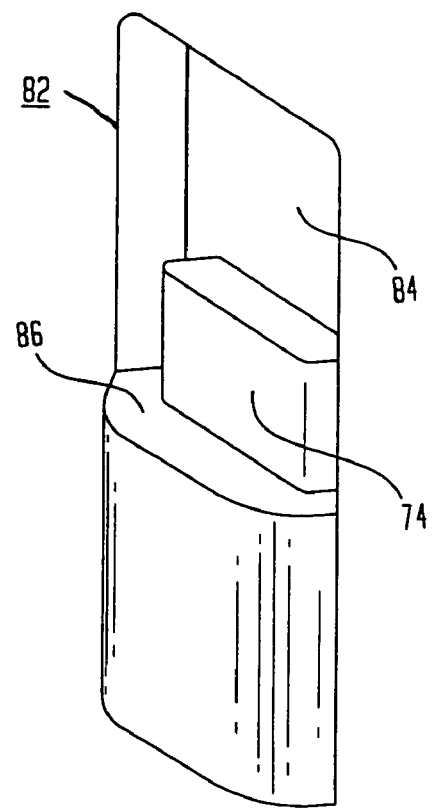
Figure 6A:
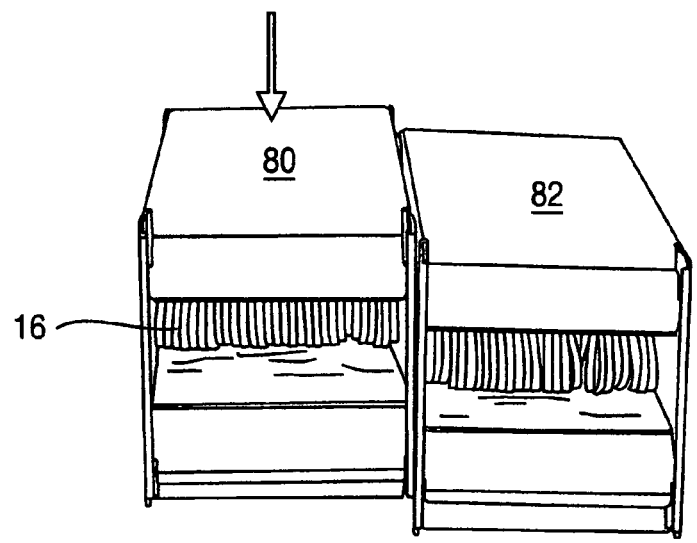
FIGS. 6A and 6B illustrate a plan view of an embodiment of the present invention wherein a combination of two adjacent similar apparatus are joined together at the side walls thereof by interlocking projecting securing members extending into an adjacent openings.
Figure 6B:
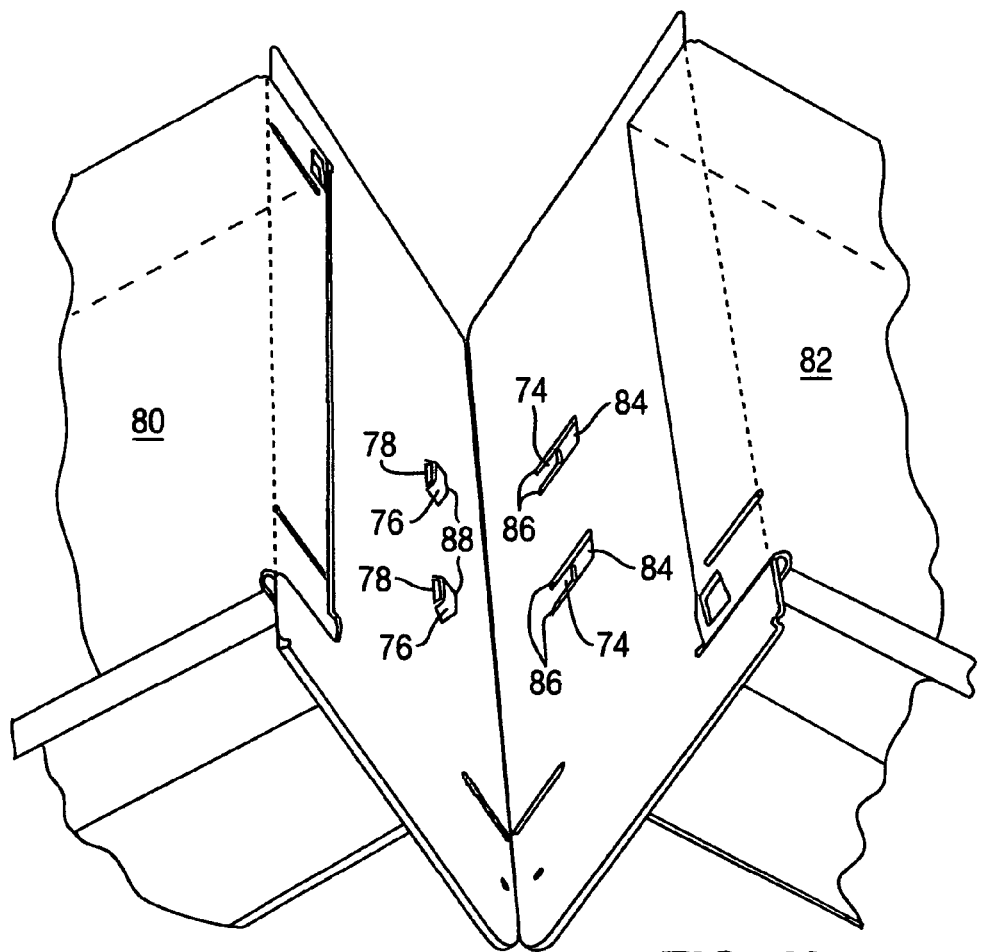

Turning now to FIGS. 5A and 5B, there can be seen perspective views of a securing member 76 having an opening 78 formed therein on a sleeve 80 and a perspective view, respectively, of a projecting securing member 74 formed in a sleeve 82. There is also an opening 84 in the side wall of sleeve 82 just above the projecting securing member 74 in order to enable the intersecuring of adjacent sleeves 80, 82 and a shoulder 86 formed at the bottom of the projecting securing member 74. As can now be explained, in the exemplary embodiment of FIGS. 5A and 5B, the joining together of the sleeves 80, 82 by means of the securing mechanism is accomplished by the inserting the securing member 76 of the sleeve 80 into the opening 84 that is located just above the projecting securing member 74 in the sleeve 82. The sleeve 80 is then lowered so that the projecting securing member 74 enters into and secures with the opening 78 in the securing member 76, thereby firmly affixing the sleeves 80, 82 together in a hook and eye type of relationship with the lower surface 88 of the securing member 76 resting against the shoulder 86 of the projecting securing member 74.

As can be seen, the use of a projecting securing member on one sleeve along with a securing member having an opening on the other sleeve to be affixed thereto is but one means of attaching adjacent sleeves together and there are many alternate embodiments that can be utilized to carry out the advantageous securing together of adjacent sleeves in the spirit of the present invention. Further, in accordance with the invention, it is advantageously possible to orient the exemplary securing mechanisms depicted in FIGS. 4 and 5A and 5B in a manner to secure two or more sleeves together to facilitate installation horizontally in a wall or vertically in a floor, or alternatively at any other installation angle. Accordingly, it is also possible to employ rotatable or rotatably lockable securing mechanisms on the sleeve to enable installation of corresponding interlocked sleeves in a large number of orientations including, walls, floors or angled positions.

It is to be understood that the invention is not limited to the illustrated and described form of the invention contained herein: It will be apparent to those skilled in the art that various changes may be made without departing form the scope of the invention and the invention is not considered limited to what is shown in the drawings and described in the specification. Although the intumescent pads 22, 24 are depicted in FIGS. 1-3 are arched, extending inwardly toward one another for defining the confinement area, it should readily be understood that it is possible employ intumescent pads of different shapes in accordance with the invention. For example, it is possible for one or both of the intumescent pads 22, 24 to be flat and not extend toward one another or for one or both intumescent pads 22, 24 to include more than one region extending toward one another. In such configuration, one or more of these intumescent pads, independent of shape, is moveable toward the other intumescent pad for adjusting the corresponding defined containment area in accordance with the invention. In addition, although in the depicted embodiment, the intumescent pads 22, 24 each extend fully through the sleeve 12, it is likewise possible in accordance with the invention to employ one or more intumescent pads that extend only partially through the sleeve for defining the confinement area.

What is claimed is:

1. An apparatus comprising: a sleeve adapted to be positioned so as to pass through a construction barrier, said sleeve providing an access corridor though the construction barrier, first and second intumescent pads located within said access corridor and extending at least partially along said access corridor to create a confinement area therebetween for creating a seal against a penetrating member passing though the confinement area in response to heat, at least one of said intumescent pads having at least a portion thereof that is movable toward the other of said intumescent pads, said sleeve including opposite ends, said apparatus further comprising a protective skirt located at least at one of said opposite ends, said protective skirt including of a plurality of loops extending downwardly from one of said first or second intumescent pads.

2. The apparatus as defined in claim 1 wherein the movable portion of the inturnescent pad is biased inwardly toward the other of the inturnescent pads.

3. The apparatus as defined in claim 2 wherein the at least one biased intumescent pad is biased by means of at least one spring acting against the at least one intumescent pad.

4. The apparatus as defined in claim 3 wherein the at least one spring comprises a plurality of springs acting along the at least one intumescent pad.

5. The apparatus as defined in claim 2 wherein at least a portion of both of the intumescent pads are biased toward each other.

6. The apparatus as defined in claim 1 wherein the protective skirt is located at both of the opposite ends of the sleeve.

7. The apparatus of claim 1 wherein the protective skirt is comprised of a poly film material having slits formed therein to create the plurality of loops.

8. An apparatus comprising: a sleeve adapted to be positioned so as to pass through a construction barrier, said sleeve providing an access corridor through the construction barrier and having oppositely disposed outer walls; at least one inner member located within the access corridor interior of said outer walls, first and second intumescent pads located within said access corridor and extending at least partially along said access corridor to create a confinement area therebetween for creating a seal against a penetrating member passing through the confinement area in response to heat, one of said intumescent pads having at least a portion thereof affixed to a location on said at least one inner member, said location on the at least one inner member where said portion of the intumescent pad is affixed being movable toward the other of the intumescent pads, further including at least one spring biasing the at least one location of the at least one inner member.

9. The apparatus as defined in claim 8 wherein the movable inner member is biased in the direction of the other of the intumescent pads.

10. The apparatus as defined in claim 8 wherein the inner member is a planar wall.

11. The apparatus as defined in claim 8 further wherein said at least one spring comprises a plurality of springs acting against the at least one location of the at least one inner member.

12. The apparatus as defined in claim 8 wherein the one intumescent pad affixed to the inner member has exterior ends and one of said exterior ends is affixed at said at least one location of the inner member.

13. The apparatus as defined in claim 12 wherein both of said exterior ends of said one intumescent pad is affixed to locations on the inner member.

14. The apparatus as defined in claim 8 wherein said oppositely disposed walls are generally flat, planar walls oriented in parallel planes to each other.

15. The apparatus as defined in claim 8 wherein said at least one inner wall has a securing device that secures exterior ends of at least one of said first or second intumescent pads to the at least one inner member.

16. A combination of two apparatus wherein each apparatus includes a sleeve adapted to be positioned so as to pass through a construction barrier, said sleeve providing an access corridor through the construction barrier and having oppositely disposed outer walls, at least one intumescent pad located within said access corridor and extending at least partially along said access corridor to create a confinement area therethrough for creating a seal against a penetrating member passing through the confinement area in response to heat, and said at least one intumescent pad being movable so as to enable adjustment of the size of the confinement area, further including at least one securing mechanism and wherein each of said two apparatus are joined together by means of at least one said securing mechanism.

17. The apparatus of claim 16 wherein the at least one intumescent pad is biased in the direction to reduce the size of the confinement area.

18. The apparatus of claim 17 wherein the at least one intumescent pad is spring biased.

19. The apparatus of claim 18 wherein the at least one intumescent pad is biased by a plurality of springs.

20. The apparatus of claim 16 wherein said at least one intumescent pad comprises two intumescent pads that are movable.

21. The combination of claim 16 wherein the sleeve of each apparatus has side walls and wherein the securing mechanism joins the side walls of adjacent apparatus together.

22. The combination of claim 21 wherein a side wall of one of the sleeves has a securing member having an opening formed therein and a side wall of the other sleeve has a corresponding securing member and wherein said side walls are joined together by sliding the securing member into the opening.

23. An apparatus comprising: first and second sleeves forming access corridors through a construction barrier, a securing mechanism on said first and second sleeves, the securing mechanism adapted to join said first and second sleeves together to facilitate the installation of the first and second sleeves through the construction barrier, said securing mechanism comprising a first securing member disposed on one of the first or second sleeves and a second securing member disposed on the other of the first and second sleeves, said first securing member and said second securing member being adapted to be interlocked together to join said first and second sleeves together, said securing members being rotatably disposed on said sleeves.

24. The apparatus as defined in claim 23 where one of said securing members comprises a projecting securing member and the other securing member has an opening therein and said securing members are interlocked together by inserting said projecting securing member into said opening.

25. The apparatus as defined in claim 23 wherein said securing members are lockably rotatably disposed on said sleeves.

* * * * *